United States Patent
Cruanes et al.

(10) Patent No.: US 11,544,269 B2
(45) Date of Patent: *Jan. 3, 2023

(54) INDEX TO SUPPORT PROCESSING OF PATTERN MATCHING QUERIES

(71) Applicant: Snowflake Inc., Bozeman, MT (US)

(72) Inventors: Thierry Cruanes, San Mateo, CA (US); Benoit Dageville, San Mateo, CA (US); Ismail Oukid, Berlin (DE); Stefan Richter, Berlin (DE)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/657,019

(22) Filed: Mar. 29, 2022

(65) Prior Publication Data
US 2022/0215027 A1 Jul. 7, 2022

Related U.S. Application Data

(63) Continuation of application No. 17/388,160, filed on Jul. 29, 2021, now Pat. No. 11,321,325, which is a
(Continued)

(51) Int. Cl.
| | | |
|---|---|---|
| *G06F 16/24* | (2019.01) | |
| *G06F 16/2455* | (2019.01) | |
| *G06F 16/9035* | (2019.01) | |
| *G06F 16/28* | (2019.01) | |

(Continued)

(52) U.S. Cl.
CPC .... *G06F 16/24557* (2019.01); *G06F 16/2272* (2019.01); *G06F 16/283* (2019.01); *G06F 16/9035* (2019.01); *G06F 17/18* (2013.01)

(58) Field of Classification Search
CPC .......... G06F 16/2272; G06F 16/24557; G06F 16/283; G06F 16/9035; G06F 17/18
See application file for complete search history.

(56) References Cited

U.S. PATENT DOCUMENTS

| | | | |
|---|---|---|---|
| 6,154,572 | A | 11/2000 | Chaddha |
| 6,374,232 | B1 | 4/2002 | Dageville et al. |
| 6,571,233 | B2 | 5/2003 | Beavin et al. |
| 6,957,225 | B1 | 10/2005 | Zait et al. |

(Continued)

FOREIGN PATENT DOCUMENTS

| | | |
|---|---|---|
| CN | 113051351 A | 6/2021 |
| EP | 2434417 A1 | 3/2012 |

(Continued)

OTHER PUBLICATIONS

"U.S. Appl. No. 17/649,642, Notice of Allowance dated Jul. 7, 2022", 10 pgs.

(Continued)

*Primary Examiner* — Merilyn P Nguyen
(74) *Attorney, Agent, or Firm* — Schwegman Lundberg & Woessner, P.A.

(57) ABSTRACT

A query directed at a source table organized into a set of batch units is received. The query includes a pattern matching predicate that specifies a search pattern. A set of N-grams are generated based on the search pattern. A pruning index associated with the source table is accessed. The pruning index comprises a set of filters that index distinct N-grams in each column of the source table. The pruning index is used to identify a subset of batch units to scan for matching data based on the set of N-grams generated for the search pattern. The query is processed by scanning the subset of batch units.

27 Claims, 11 Drawing Sheets

Related U.S. Application Data continuation of application No. 17/218,962, filed on Mar. 31, 2021, now Pat. No. 11,113,286, which is a continuation of application No. 17/086,228, filed on Oct. 30, 2020, now Pat. No. 10,997,179, which is a continuation-in-part of application No. 16/932,462, filed on Jul. 17, 2020, now Pat. No. 10,942,925, which is a continuation of application No. 16/727,315, filed on Dec. 26, 2019, now Pat. No. 10,769,150.

(60) Provisional application No. 63/084,394, filed on Sep. 28, 2020.

(51) Int. Cl.
*G06F 16/22* (2019.01)
*G06F 17/18* (2006.01)

(56) References Cited

U.S. PATENT DOCUMENTS

| | | | |
|---|---|---|---|
| 7,171,427 | B2 | 1/2007 | Witkowski et al. |
| 7,454,418 | B1 | 11/2008 | Wang et al. |
| 7,814,104 | B2 | 10/2010 | Raghavan et al. |
| 7,970,756 | B2 | 6/2011 | Beavin et al. |
| 8,209,178 | B1 | 6/2012 | Talbot et al. |
| 8,458,156 | B1* | 6/2013 | Sharifi .................. G06F 16/38 707/705 |
| 8,589,640 | B2 | 11/2013 | Colgrove et al. |
| 8,666,976 | B2 | 3/2014 | Merz |
| 8,887,286 | B2 | 11/2014 | Dupont et al. |
| 9,223,850 | B2 | 12/2015 | Chen |
| 9,298,726 | B1 | 3/2016 | Mondal et al. |
| 9,401,967 | B2 | 7/2016 | Sabaa et al. |
| 9,471,711 | B2 | 10/2016 | Abadi et al. |
| 9,507,825 | B2 | 11/2016 | Baer et al. |
| 9,514,187 | B2 | 12/2016 | Ziauddin |
| 9,703,796 | B2 | 7/2017 | Kumar et al. |
| 10,025,823 | B2 | 7/2018 | Das et al. |
| 10,231,085 | B1 | 3/2019 | Kumar et al. |
| 10,311,062 | B2 | 6/2019 | McPherson et al. |
| 10,353,867 | B1 | 7/2019 | Wong et al. |
| 10,388,272 | B1* | 8/2019 | Thomson ................ G10L 15/22 |
| 10,528,599 | B1 | 1/2020 | Pandis et al. |
| 10,573,312 | B1* | 2/2020 | Thomson .............. G10L 15/187 |
| 10,628,418 | B2 | 4/2020 | Weyerhaeuser et al. |
| 10,649,991 | B2 | 5/2020 | Finlay et al. |
| 10,685,052 | B2 | 6/2020 | Winther |
| 10,705,809 | B2 | 7/2020 | Makkar |
| 10,713,243 | B2 | 7/2020 | Mathur |
| 10,769,150 | B1 | 9/2020 | Cruanes et al. |
| 10,812,495 | B2 | 10/2020 | Traore et al. |
| 10,838,963 | B2 | 11/2020 | Brodt et al. |
| 10,860,832 | B2 | 12/2020 | Wang |
| 10,901,948 | B2 | 1/2021 | Ackerman et al. |
| 10,942,925 | B1 | 3/2021 | Cruanes et al. |
| 10,997,179 | B1 | 5/2021 | Cruanes et al. |
| 11,010,257 | B2 | 5/2021 | Wong et al. |
| 11,016,975 | B1 | 5/2021 | Cruanes et al. |
| 11,037,258 | B2 | 6/2021 | Brenner et al. |
| 11,042,650 | B2 | 6/2021 | Fu et al. |
| 11,086,875 | B2 | 8/2021 | Cruanes et al. |
| 11,113,286 | B2 | 9/2021 | Cruanes et al. |
| 11,163,745 | B2 | 11/2021 | Coleman et al. |
| 11,177,944 | B1 | 11/2021 | Ahmed et al. |
| 11,194,793 | B1 | 12/2021 | Srivastava et al. |
| 11,269,839 | B2 | 3/2022 | Miraldo et al. |
| 11,275,738 | B2 | 3/2022 | Oukid et al. |
| 11,275,739 | B2 | 3/2022 | Oukid et al. |
| 11,308,089 | B2 | 4/2022 | Cruanes et al. |
| 11,321,325 | B2 | 5/2022 | Cruanes et al. |
| 2004/0243816 | A1 | 12/2004 | Hacigumus et al. |
| 2005/0120004 | A1 | 6/2005 | Stata et al. |
| 2005/0198076 | A1 | 9/2005 | Stata et al. |
| 2008/0294696 | A1 | 11/2008 | Frandzel |
| 2009/0070303 | A1 | 3/2009 | Beavin et al. |
| 2009/0100055 | A1 | 4/2009 | Wang |
| 2010/0125594 | A1 | 5/2010 | Li et al. |
| 2010/0281017 | A1 | 11/2010 | Hu et al. |
| 2010/0318519 | A1 | 12/2010 | Hadjieleftheriou et al. |
| 2011/0213775 | A1 | 9/2011 | Franke et al. |
| 2013/0166553 | A1 | 6/2013 | Yoon et al. |
| 2013/0166557 | A1 | 6/2013 | Fricke et al. |
| 2013/0346720 | A1 | 12/2013 | Colgrove et al. |
| 2014/0114942 | A1 | 4/2014 | Belakovskiy et al. |
| 2014/0154352 | A1 | 6/2014 | Altonen et al. |
| 2014/0201126 | A1* | 7/2014 | Zadeh .................... A61B 5/165 706/52 |
| 2014/0223565 | A1 | 8/2014 | Cohen |
| 2014/0365424 | A1 | 12/2014 | Herbst et al. |
| 2015/0134670 | A1* | 5/2015 | Liu .......................... G06F 16/20 707/741 |
| 2015/0254338 | A1 | 9/2015 | Cheluvaraja et al. |
| 2015/0269934 | A1 | 9/2015 | Biadsy et al. |
| 2015/0286681 | A1 | 10/2015 | Baer et al. |
| 2016/0026667 | A1 | 1/2016 | Mukherjee et al. |
| 2016/0162364 | A1 | 6/2016 | Mutha et al. |
| 2016/0350347 | A1 | 12/2016 | Das et al. |
| 2016/0350392 | A1 | 12/2016 | Rice et al. |
| 2017/0060944 | A1 | 3/2017 | Khayyat et al. |
| 2017/0109295 | A1 | 4/2017 | Lasperas et al. |
| 2017/0116136 | A1 | 4/2017 | Macnicol et al. |
| 2017/0116271 | A1 | 4/2017 | Ziauddin et al. |
| 2017/0139989 | A1 | 5/2017 | Weyerhaeuser et al. |
| 2017/0220652 | A1* | 8/2017 | Kazi ...................... G06Q 50/01 |
| 2017/0300862 | A1 | 10/2017 | Bhadouria et al. |
| 2018/0011893 | A1 | 1/2018 | Kimura |
| 2018/0052904 | A1 | 2/2018 | Fusco et al. |
| 2018/0068008 | A1 | 3/2018 | Cruanes et al. |
| 2018/0075109 | A1 | 3/2018 | Park et al. |
| 2018/0101540 | A1 | 4/2018 | Stoop et al. |
| 2018/0113889 | A1 | 4/2018 | Brodt |
| 2018/0253438 | A1 | 9/2018 | Zaydman |
| 2018/0275982 | A1 | 9/2018 | Hunt et al. |
| 2018/0307857 | A1 | 10/2018 | Beecham et al. |
| 2019/0102441 | A1 | 4/2019 | Malak et al. |
| 2019/0130250 | A1 | 5/2019 | Park et al. |
| 2019/0205376 | A1 | 7/2019 | Merhav et al. |
| 2019/0220464 | A1 | 7/2019 | Butani |
| 2019/0303270 | A1 | 10/2019 | Hoermann |
| 2019/0332722 | A1 | 10/2019 | Ogren et al. |
| 2019/0370241 | A1 | 12/2019 | Miraldo et al. |
| 2020/0026788 | A1 | 1/2020 | Bellamkonda et al. |
| 2020/0117546 | A1 | 4/2020 | Wong et al. |
| 2020/0125674 | A1 | 4/2020 | Arunski et al. |
| 2020/0175961 | A1* | 6/2020 | Thomson ................ G10L 15/28 |
| 2020/0184278 | A1* | 6/2020 | Zadeh .................. G06K 9/6264 |
| 2020/0285761 | A1 | 9/2020 | Buck et al. |
| 2020/0373946 | A1 | 11/2020 | Lee et al. |
| 2021/0117232 | A1 | 4/2021 | Sriharsha et al. |
| 2021/0117868 | A1 | 4/2021 | Sriharsha |
| 2021/0200772 | A1 | 7/2021 | Cruanes et al. |
| 2021/0216517 | A1 | 7/2021 | Graefe |
| 2021/0216555 | A1 | 7/2021 | Cruanes et al. |
| 2021/0271644 | A1 | 9/2021 | Chinthekindi et al. |
| 2021/0319025 | A1 | 10/2021 | Cruanes et al. |
| 2021/0357411 | A1 | 11/2021 | Cruanes et al. |
| 2021/0365461 | A1 | 11/2021 | Allahverdiyev et al. |
| 2021/0397619 | A1 | 12/2021 | Heimel et al. |
| 2022/0012246 | A1 | 1/2022 | Oukid et al. |
| 2022/0012247 | A1 | 1/2022 | Oukid et al. |
| 2022/0156264 | A1 | 5/2022 | Oukid et al. |

FOREIGN PATENT DOCUMENTS

| | | |
|---|---|---|
| WO | WO-2021/133433 A1 | 7/2021 |
| WO | WO-2022/016170 A1 | 1/2022 |

OTHER PUBLICATIONS

"U.S. Appl. No. 17/649,642, Response filed Jun. 22, 2022 to Non Final Office Action dated Apr. 1, 2022", 10 pgs.

(56) References Cited

OTHER PUBLICATIONS

"Indian Application Serial No. 202044053756, Response filed Jun. 21, 2022 to First Examination Report dated Dec. 21, 2021", 31 pgs.
"U.S. Appl. No. 16/727,315, Examiner Interview Summary dated Jun. 2, 2020", 3 pgs.
"U.S. Appl. No. 16/727,315, Non-Final Office Action dated Mar. 2, 2020", 12 pgs.
"U.S. Appl. No. 16/727,315, Notice of Allowance dated Jun. 8, 2020", 9 pgs.
"U.S. Appl. No. 16/727,315, Response Filed May 27, 2020 to Non-Final Office Action dated Mar. 2, 2020", 14 pgs.
"U.S. Appl. No. 16/932,462, Examiner Interview Summary dated Nov. 25, 2020", 3 pgs.
"U.S. Appl. No. 16/932,462, Non-Final Office Action dated Aug. 21, 2020", 11 pgs.
"U.S. Appl. No. 16/932,462, Notice of Allowance dated Dec. 15, 2020", 9 pgs.
"U.S. Appl. No. 16/932,462, Response filed Nov. 23, 2020 to Non-Final Office Action dated Aug. 21, 2020", 12 pgs.
"U.S. Appl. No. 17/086,228, Non-Final Office Action dated Dec. 28, 2020", 12 pgs.
"U.S. Appl. No. 17/086,228, Notice of Allowance dated Jan. 22, 2021", 7 pgs.
"U.S. Appl. No. 17/086,228, Response filed Jan. 4, 2021 to Non Final Office Action dated Dec. 28, 2020", 8 pgs.
"U.S. Appl. No. 17/086,239, Non-Final Office Action dated Dec. 17, 2020", 15 pgs.
"U.S. Appl. No. 17/086,239, Notice of Allowance dated Apr. 9, 2021", 15 pgs.
"U.S. Appl. No. 17/086,239, Response filed Mar. 17, 2021 to Non Final Office Action dated Dec. 17, 2020", 12 pgs.
"U.S. Appl. No. 17/161,115, Corrected Notice of Allowability dated Jun. 24, 2021", 2 pgs.
"U.S. Appl. No. 17/161,115, Final Office Action dated Apr. 28, 2021", 17 pgs.
"U.S. Appl. No. 17/161,115, Non-Final Office Action dated Mar. 23, 2021", 19 pgs.
"U.S. Appl. No. 17/161,115, Notice of Allowance dated May 12, 2021", 8 pgs.
"U.S. Appl. No. 17/161,115, Response filed Apr. 15, 2021 to Non-Final Office Action dated Mar. 23, 2021", 12 pgs.
"U.S. Appl. No. 17/161,115, Response filed Apr. 30, 2021 to Final Office Action dated Apr. 28, 2021", 8 pgs.
"U.S. Appl. No. 17/218,962, Corrected Notice of Allowability dated Jul. 12, 2021", 2 pgs.
"U.S. Appl. No. 17/218,962, Non-Final Office Action dated Jun. 4, 2021", 21 pgs.
"U.S. Appl. No. 17/218,962, Notice of Allowance dated Jul. 2, 2021", 8 pgs.
"U.S. Appl. No. 17/218,962, Response filed Jun. 10, 2021 to Non-Final Office Action dated Jun. 4, 2021", 9 pgs.
"U.S. Appl. No. 17/358,154, Corrected Notice of Allowability dated Mar. 2, 2022", 2 pgs.
"U.S. Appl. No. 17/358,154, Non-Final Office Action dated Oct. 20, 2021", 24 pgs.
"U.S. Appl. No. 17/358,154, Notice of Allowance dated Feb. 14, 2022", 9 pgs.
"U.S. Appl. No. 17/358,154, Response filed Jan. 17, 2022 to Non Final Office Action dated Oct. 20, 2021", 11 pgs.
"U.S. Appl. No. 17/388,160, Non-Final Office Action dated Dec. 6, 2021", 24 pgs.
"U.S. Appl. No. 17/388,160, Notice of Allowance dated Mar. 2, 2022", 10 pgs.
"U.S. Appl. No. 17/388,160, Response filed Jan. 28, 2022 to Non-Final Office Action dated Dec. 6, 2021", 10 pgs.
"U.S. Appl. No. 17/394,149, Non-Final Office Action dated Dec. 13, 2021", 18 pgs.
"U.S. Appl. No. 17/394,149, Notice of Allowance dated Feb. 18, 2022", 9 pgs.
"U.S. Appl. No. 17/394,149, Response filed Jan. 28, 2022 to Non-Final Office Action dated Dec. 13, 2021", 10 pgs.
"U.S. Appl. No. 17/462,796, Examiner Interview Summary dated Mar. 22, 2022", 2 pgs.
"U.S. Appl. No. 17/462,796, Non-Final Office Action dated Dec. 21, 2021", 18 pgs.
"U.S. Appl. No. 17/462,796, Response filed Mar. 21, 2022 to Non-Final Office Action dated Dec. 21, 2021", 12 pgs.
"U.S. Appl. No. 17/484,817, Corrected Notice of Allowability dated Jan. 20, 2022", 2 pgs.
"U.S. Appl. No. 17/484,817, Non-Final Office Action dated Oct. 29, 2021", 35 pgs.
"U.S. Appl. No. 17/484,817, Notice of Allowance dated Jan. 11, 2022", 10 pgs.
"U.S. Appl. No. 17/484,817, Response filed Nov. 30, 2021 to Non-Final Office Action dated Oct. 29, 2021", 10 pgs.
"U.S. Appl. No. 17/486,426, Non-Final Office Action dated Nov. 22, 2021", (16 pgs.).
"U.S. Appl. No. 17/486,426, Notice of Allowance dated Dec. 27, 2021", 9 pgs.
"U.S. Appl. No. 17/486,426, Response filed Nov. 30, 2021 to Non-Final Office Action dated Nov. 22, 2021", 10 pgs.
"U.S. Appl. No. 17/649,642, Non-Final Office Action dated Apr. 1, 2022", 13 pgs.
"European Application Serial No. 20216097.4, Extended European Search Report dated May 20, 2021", 7 pgs.
"European Application Serial No. 20216097.4, Response filed Dec. 22, 2021 to Extended European Search Report dated May 20, 2021", 32 pgs.
"Indian Application Serial No. 202044053756, First Examination Report dated Dec. 21, 2021", 6 pgs.
"International Application Serial No. PCT/US2020/044199, International Search Report dated Aug. 26, 2020", 2 pgs.
"International Application Serial No. PCT/US2020/044199, Written Opinion dated Aug. 26, 2020", 6 pgs.
"International Application Serial No. PCT/US2021/070808, International Search Report dated Jul. 26, 2021", 2 pgs.
"International Application Serial No. PCT/US2021/070808, Written Opinion dated Jul. 26, 2021", 3 pgs.
U.S. Appl. No. 16/727,315 U.S. Pat. No. 10,769,150, filed Dec. 26, 2019, Pruning Indexes to Enhance Database Query Processing.
U.S. Appl. No. 16/932,462 U.S. Pat. No. 10,942,925, filed Jul. 17, 2020, Database Query Processing Using a Pruning Index.
U.S. Appl. No. 17/161,115 U.S. Pat. No. 11,086,875, filed Jan. 28, 2021, Database Query Processing Using a Pruning Index.
U.S. Appl. No. 17/654,887, filed Mar. 15, 2022, Pruning Index Generation and Enhancement.
U.S. Appl. No. 17/358,154 U.S. Pat. No. 11,308,089, filed Jun. 25, 2021, Puning Index Maintenance.
U.S. Appl. No. 17/086,228 U.S. Pat. No. 10/997,179, filed Oct. 30, 2020, Pruning Index for Optimization of Pattern Matching Queries.
U.S. Appl. No. 17/086,239 U.S. Pat. No. 11,016,975, filed Oct. 30, 2020, Scan Set Pruning for Pattern Matching Queries.
U.S. Appl. No. 17/218,862 U.S. Pat. No. 11,113,286, filed Mar. 31, 2021, Generation of Pruning Index for Pattern Matching Queries.
U.S. Appl. No. 17/388,160 U.S. Pat. No. 11,321,325, filed Jul. 29, 2021, Pruning Index Generation for Pattern Matching Queries.
U.S. Appl. No. 17/484,817 U.S. Pat. No. 11,275,738, filed Sep. 24, 2021, Prefix N-Gram Indexing.
U.S. Appl. No. 17/486,426 U.S. Pat. No. 11,275,739, filed Sep. 27, 2021, Prefix Indexing.
U.S. Appl. No. 17/649,642, filed Feb. 1, 2022, Pruning Using Prefix Indexing.

* cited by examiner

| PARTITION# | ... | BLOOM[0] (8 BYTES) | ... | BLOOM[N] (8 BYTES) |
|---|---|---|---|---|
| P000 | ... | 00101 | ... | 0101 |
| P002 | ... | 10010 | ... | 1110 |
| ... | ... | ... | ... | |
| P1001 | ... | 00101 | ... | 0011 |
| P1001 | ... | 10010 | ... | 1100 |

FIG. 5

INDEX TO SUPPORT PROCESSING OF PATTERN MATCHING QUERIES

PRIORITY CLAIM

This application is a Continuation of U.S. patent application Ser. No. 17/388,160, entitled "PRUNING INDEX GENERATION FOR PATTERN MATCHING QUERIES", filed Jul. 29, 2021, now issued as U.S. Pat. No. 11,321,325, which is a Continuation of U.S. patent application Ser. No. 17/218,962, entitled "GENERATION OF PRUNING INDEX FOR PATTERN MATCHING QUERIES", filed Mar. 31, 2021, now issued as U.S. Pat. No. 11,113,286, which is a Continuation of U.S. patent application Ser. No. 17/086,228, entitled "PRUNING INDEX FOR OPTIMIZATION OF PATTERN MATCHING QUERIES", filed Oct. 30, 2020, now issued as U.S. Pat. No. 10,997,719, which claims priority to U.S. Provisional Patent Application No. 63/084,394 filed on Sep. 28, 2020 and is a continuation-in-part of U.S. patent application Ser. No. 16/932,462, entitled "DATABASE QUERY PROCESSING USING A PRUNING INDEX," filed on Jul. 17, 2020, now issued as U.S. Pat. No. 10,942,925, which is a continuation of U.S. patent Ser. No. 16/727,315, entitled "PRUNING INDEXES TO ENHANCE DATABASE QUERY PROCESSING," filed on Dec. 26, 2019, now issued as U.S. Pat. No. 10,769,150, the contents of which are incorporated herein by reference in their entireties.

TECHNICAL FIELD

Embodiments of the disclosure relate generally to databases and, more specifically, to generating and using pruning indexes to optimize processing of pattern matching queries in a database system.

BACKGROUND

Databases are widely used for data storage and access in computing applications. A goal of database storage is to provide enormous sums of information in an organized manner so that it can be accessed, managed, and updated. In a database, data may be organized into rows, columns, and tables. Databases are used by various entities and companies for storing information that may need to be accessed or analyzed.

When certain information is to be extracted from a database, a query statement may be executed against the database data. A database system processes the query and returns certain data according to one or more query predicates that indicate what information should be returned by the query. The database system extracts specific data from the database and formats that data into a readable form. However, it can be challenging to execute queries on a very large table because a significant amount of time and computing resources are required to scan an entire table to identify data that satisfies the query.

BRIEF DESCRIPTION OF THE DRAWINGS

The present disclosure will be understood more fully from the detailed description given below and from the accompanying drawings of various embodiments of the disclosure.

FIG. 5 illustrates a portion of an example pruning index, in accordance with some embodiments of the present disclosure.

DETAILED DESCRIPTION

Figure 1:
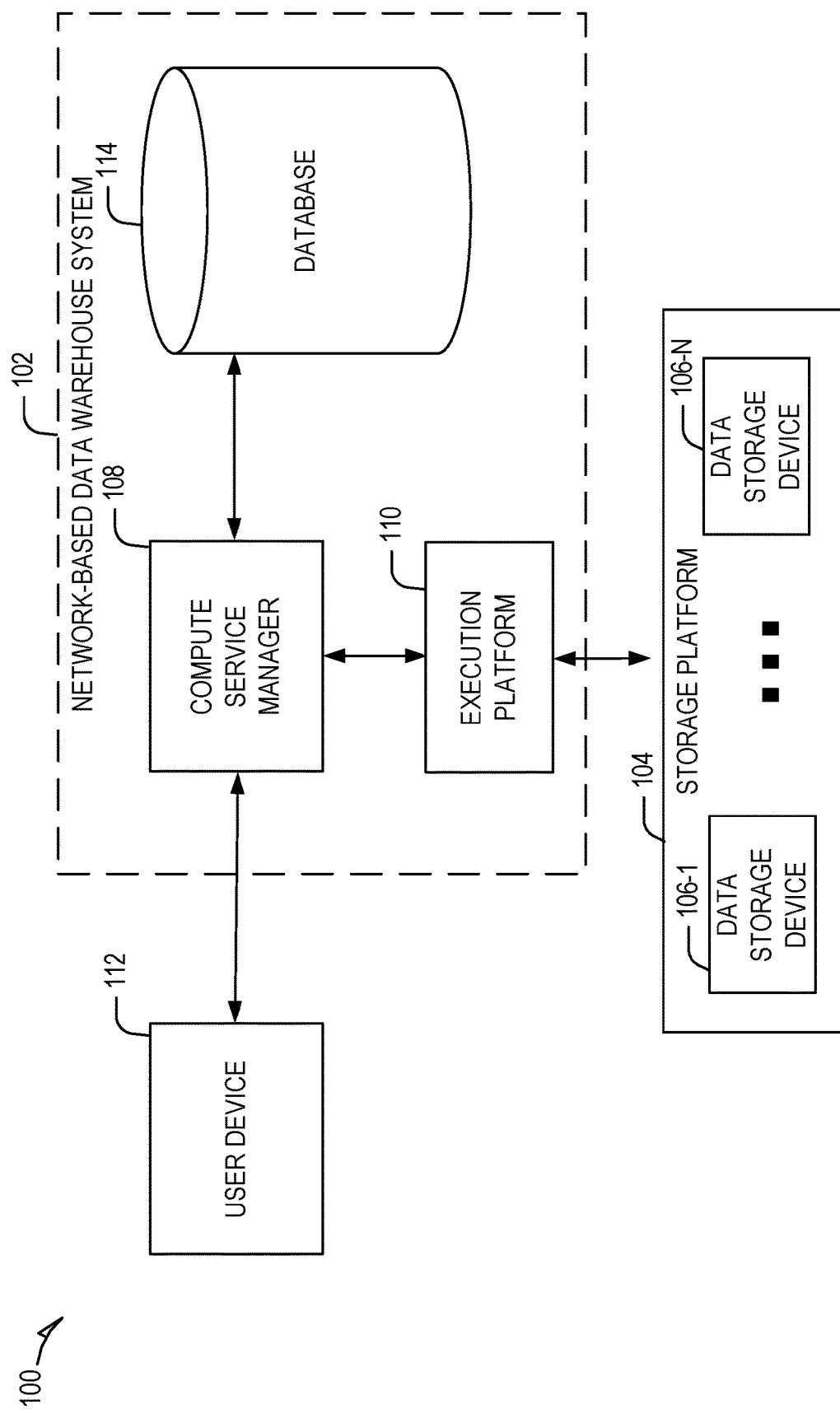
FIG. 1 illustrates an example computing environment that includes a network-based database system in communication with a cloud storage provider system, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

As noted above, processing queries directed to very large tables is challenging because a significant amount of time and computing resources are required to scan an entire table to identify data that satisfies the query. Therefore, it can be desirable to execute a query without scanning the entire table. Aspects of the present disclosure address the above and other challenges in processing queries on large tables by creating a pruning index that may be used to construct a reduced scan set for processing a query. More specifically, a large source table may be organized into a set of batch units such as micro-partitions, and a pruning index can be created for the source table to be used in identifying a subset of the batch units to scan to identify data that satisfies the query.

As discussed herein, a "micro-partition" is a batch unit, and each micro-partition has contiguous units of storage. By way of example, each micro-partition may contain between 50 MB and 500 MB of uncompressed data (note that the actual size in storage may be smaller because data may be stored compressed). Groups of rows in tables may be mapped into individual micro-partitions organized in a columnar fashion. This size and structure allow for extremely granular selection of the micro-partitions to be scanned, which can be comprised of millions, or even hundreds of millions, of micro-partitions. This granular selection process for micro-partitions to be scanned is referred to herein as "pruning." Pruning involves using metadata to determine which portions of a table, including which micro-partitions or micro-partition groupings in the table, are not pertinent to a query, and then avoiding those non-pertinent micro-partitions when responding to the query and scanning only the pertinent micro-partitions to respond to the query. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded. However, it should be appreciated that this disclosure of the micro-partition is exemplary only and should be considered non-limiting. It should be appreciated that the micro-partition may include other database storage devices without departing from the scope of the disclosure.

Consistent with some embodiments, a network-based database system generates a pruning index for a source table and uses the pruning index to prune micro-partitions of the source table when processing queries directed to the source table. The pruning index includes a probabilistic data structure that stores fingerprints for all searchable values in a source table. The fingerprints are based on a hash computed over N-grams of preprocessed variants of each searchable value in the source table. As an example of the preprocessed variants, the data values in the source table can be case-sensitive strings and the strings can be normalized to case-agnostic variants (e.g., by making all characters lower case) before computing the fingerprints. In another example, multiple variants of a particular string can be determined to account for common or acceptable misspellings of search terms before computing the fingerprints for the string. In yet another example, multiple variants of a particular string can be determined based on synonyms of the string before computing fingerprints for the string.

Fingerprints are computed for all N-grams of each preprocessed variant of a searchable value. For a given data value, the database system generates a set of N-grams by breaking the data value into multiple segments of equal length. In an example, the value of N is three and the searchable value is "solution." In this example, database system computes fingerprints for "sol", "olu", "lut," "uti", "tio", and "ion".

In generating a pruning index, the network-based database system generates a filter for each micro-partition of the source table that indexes distinct N-grams in each column of the micro-partition of the source table. The filter may, for example, comprise a blocked bloom filter, a bloom filter, a hash filter, or a cuckoo filter.

For a given query, the pruning index can be used to quickly disqualify micro-partitions that are certain to not include data that satisfies the query. When a query is received, rather than scanning the entire source table to identify matching data, the network-based database system probes the pruning index to identify a reduced scan set of micro-partitions comprising only a subset of the micro-partitions of the source table, and only the reduced scan set of micro-partitions is scanned when executing the query.

The database system can use a pruning index to prune a scan set for queries with equality predicates (e.g., "=") as well as queries with pattern matching predicates (e.g., LIKE, ILIKE, CONTAINS, STARTSWITH, ENDSWITH, etc.).

For a given equality predicate, the database system uses the pruning index to identify a subset of micro-partitions to scan for data that completely matches an entire string or other searchable value. For a given pattern matching predicate, the database system uses the pruning index to identify a set of micro-partitions to scan for data that matches a specified search pattern, which can include one or more partial strings and one or more wildcards (e.g., "%" or "_") used to represent wildcard character positions in the pattern (e.g., character positions whose underlying value unconstrained by the query).

By using a pruning index to prune the set of micro-partitions to scan in executing a query, the database system accelerates the execution of point queries on large tables when compared to conventional methodologies. Using a pruning index in this manner also guarantees a constant overhead for every searchable value on the table. Additional benefits of pruning index utilization include, but are not limited to, an ability to support multiple predicate types, an ability to quickly compute the number of distinct values in a table, and the ability to support join pruning.

FIG. 1 illustrates an example computing environment 100 that includes a database system 102 in communication with a storage platform 104, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the computing environment 100 comprises the database system 102 and a storage platform 104 (e.g., AWS®, Microsoft Azure Blob Storage®, or Google Cloud Storage®). The database system 102 is used for reporting and analysis of integrated data from one or more disparate sources including storage devices 106-1 to 106-N within the storage platform 104. The storage platform 104 comprises a plurality of computing machines and provides on-demand computer system resources such as data storage and computing power to the database system 102.

The database system 102 comprises a compute service manager 108, an execution platform 110, and a database 114. The database system 102 hosts and provides data reporting and analysis services to multiple client accounts. Administrative users can create and manage identities (e.g., users, roles, and groups) and use permissions to allow or deny access to the identities to resources and services.

The compute service manager 108 coordinates and manages operations of the database system 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a user device 112. The user device 112 corresponds to a user of one of the multiple client accounts supported by the database system 102. In some embodiments, the compute service manager 108 does not receive any direct communications from the user device 112 and only receives communications concerning jobs from a queue within the database system 102.

The compute service manager 108 is also coupled to database 114, which is associated with the data stored in the computing environment 100. The database 114 stores data pertaining to various functions and aspects associated with the database system 102 and its users. In some embodiments, the database 114 includes a summary of data stored in remote data storage systems as well as data available from a local cache. Additionally, the database 114 may include information regarding how data is organized in remote data storage systems (e.g., the storage platform 104) and the local caches. The database 114 allows systems and services to determine whether a piece of data needs to be accessed without loading or accessing the actual data from a storage device.

For example, the database 114 can include one or more pruning indexes. The compute service manager 108 may generate a pruning index for each source table accessed from the storage platform 104 and use a pruning index to prune the set of micro-partitions of a source table to scan for data in executing a query. That is, given a query directed at a source table organized into a set of micro-partitions, the computing service manger 108 can access a pruning index from the database 114 and use the pruning index to identify a reduced set of micro-partitions to scan in executing the query. The set of micro-partitions to scan in executing a query may be referred to herein as a "scan set."

In some embodiments, the compute service manager 108 may determine that a job should be performed based on data from the database 114. In such embodiments, the compute service manager 108 may scan the data and determine that a job should be performed to improve data organization or database performance. For example, the compute service manager 108 may determine that a new version of a source table has been generated and the pruning index has not been refreshed to reflect the new version of the source table. The database 114 may include a transactional change tracking stream indicating when the new version of the source table was generated and when the pruning index was last refreshed. Based on that transaction stream, the compute service manager 108 may determine that a job should be performed. In some embodiments, the compute service manager 108 determines that a job should be performed based on a trigger event and stores the job in a queue until the compute service manager 108 is ready to schedule and manage the execution of the job. In an embodiment of the disclosure, the compute service manager 108 determines whether a table or pruning index needs to be reclustered based on one or more DML, commands being performed, wherein one or more of DML commands constitute the trigger event.

The compute service manager 108 is further coupled to the execution platform 110, which provides multiple computing resources that execute various data storage and data retrieval tasks. The execution platform 110 is coupled to storage platform 104 of the storage platform 104. The storage platform 104 comprises multiple data storage devices 106-1 to 106-N. In some embodiments, the data storage devices 106-1 to 106-N are cloud-based storage devices located in one or more geographic locations. For example, the data storage devices 106-1 to 106-N may be part of a public cloud infrastructure or a private cloud infrastructure. The data storage devices 106-1 to 106-N may be hard disk drives (HDDs), solid state drives (SSDs), storage clusters, Amazon S3™ storage systems or any other data storage technology. Additionally, the storage platform 104 may include distributed file systems (e.g., Hadoop Distributed File Systems (HDFS)), object storage systems, and the like.

The execution platform 110 comprises a plurality of compute nodes. A set of processes on a compute node executes a query plan compiled by the compute service manager 108. The set of processes can include: a first process to execute the query plan; a second process to monitor and delete micro-partition files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, the data storage devices 106-1 to 106-N are decoupled from the computing resources associated with the execution platform 110. This architecture supports dynamic changes to the database system 102 based on the changing data storage/retrieval needs as well as the changing needs of the users and systems. The support of dynamic changes allows the database system 102 to scale quickly in response to changing demands on the systems and components within the database system 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

The compute service manager 108, database 114, execution platform 110, and storage platform 104 are shown in FIG. 1 as individual discrete components. However, each of the compute service manager 108, database 114, execution platform 110, and storage platform 104 may be implemented as a distributed system (e.g., distributed across multiple systems/platforms at multiple geographic locations). Additionally, each of the compute service manager 108, database 114, execution platform 110, and storage platform 104 can be scaled up or down (independently of one another) depending on changes to the requests received and the changing needs of the database system 102. Thus, in the described embodiments, the database system 102 is dynamic and supports regular changes to meet the current data processing needs.

During typical operation, the database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in the database 114 assists the compute service manager 108 in determining which nodes in the execution platform 110 have already cached at least a portion of the data needed to process the task. One or more nodes in the execution platform 110 process the task using data cached by the nodes and, if necessary, data retrieved from the storage platform 104. It is desirable to retrieve as much data as possible from caches within the execution platform 110 because the retrieval speed is typically much faster than retrieving data from the storage platform 104.

As shown in FIG. 1, the computing environment 100 separates the execution platform 110 from the storage platform 104. In this arrangement, the processing resources and cache resources in the execution platform 110 operate independently of the data storage devices 106-1 to 106-N in the storage platform 104. Thus, the computing resources and cache resources are not restricted to specific data storage devices 106-1 to 106-N. Instead, all computing resources and all cache resources may retrieve data from, and store data to, any of the data storage resources in the storage platform 104.

Figure 2:
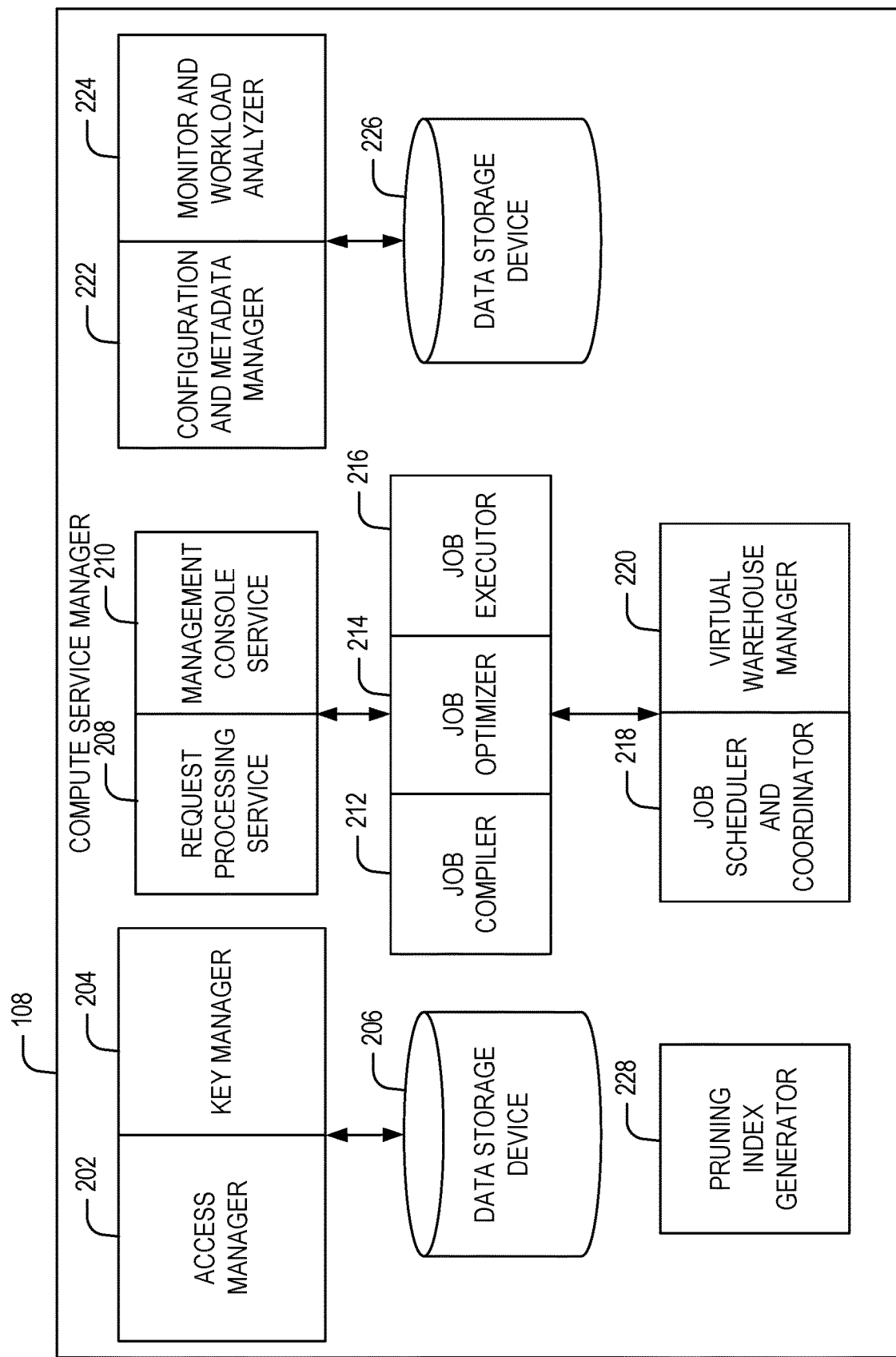
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a key manager 204 coupled to a data storage device 206. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in storage platform 104). As used herein, the remote storage devices may also be referred to as "persistent storage devices" or "shared storage devices."

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. As discussed below, each virtual warehouse includes multiple execution nodes that each include a cache and a processor.

Additionally, the compute service manager 108 includes a configuration and metadata manager 222, which manages the information related to the data stored in the remote data storage devices and in the local caches (e.g., the caches in execution platform 110). The configuration and metadata manager 222 uses the metadata to determine which data micro-partitions need to be accessed to retrieve data for processing a particular task or job. A monitor and workload analyzer 224 oversee processes performed by the compute service manager 108 and manages the distribution of tasks (e.g., workload) across the virtual warehouses and execution nodes in the execution platform 110. The monitor and workload analyzer 224 also redistribute tasks, as needed, based on changing workloads throughout the database system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the database system 102. For example, data storage device 226 may represent caches in execution platform 110, storage devices in storage platform 104, or any other storage device.

As shown, the compute service manager 108 further includes a pruning index generator 228. The pruning index generator 228 is responsible for generating pruning indexes to be used in pruning scan sets for queries directed to tables stored in the storage platform 104. Each pruning index comprises a set of filters (e.g., blocked bloom filters, bloom filters, hash filter, or cuckoo filters) that encode an existence of unique N-grams in each column of a source table. The pruning index generator 228 generates a filter for each micro-partition of a source table and each filter indicates whether data matching a query is potentially stored on a particular micro-partition of the source table. Further details regarding the generation of pruning indexes are discussed below.

Figure 3:
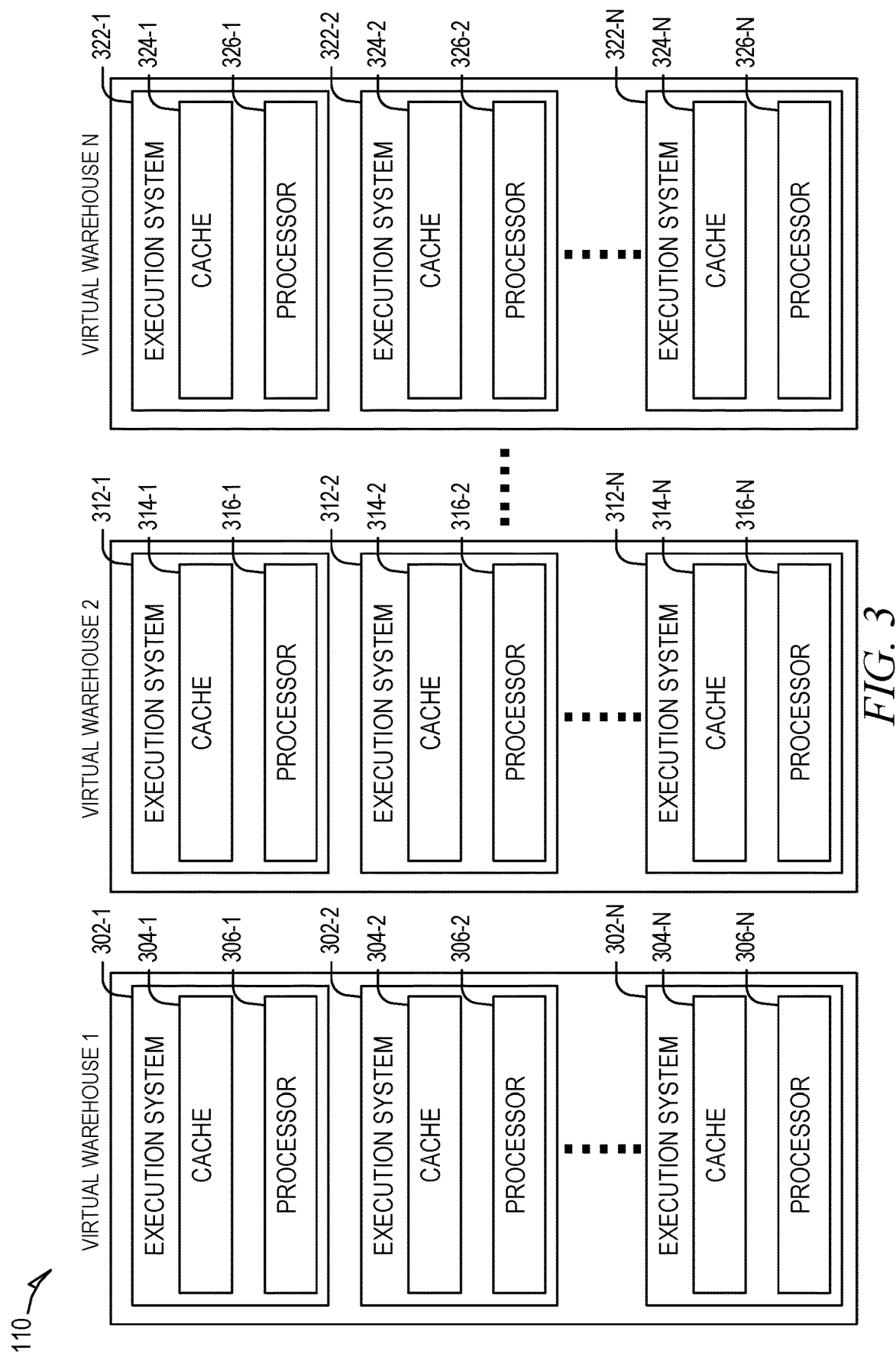
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse n. Each virtual warehouse includes multiple execution nodes that each includes a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 106-1 to 106-N shown in FIG. 1. Thus, the virtual warehouses are not necessarily assigned to a specific data storage device 106-1 to 106-$n$ and, instead, can access data from any of the data storage devices 106-1 to 106-N within the storage platform 104. Similarly, each of the execution nodes shown in FIG. 3 can access data from any of the data storage devices 106-1 to 106-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-$n$. Execution node 302-1 includes a cache 304-1 and a processor 306-1. Execution node 302-2 includes a cache 304-2 and a processor 306-2. Execution node 302-$n$ includes a cache 304-$n$ and a processor 306-$n$. Each execution node 302-1, 302-2, and 302-$n$ is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-$n$. Execution node 312-1 includes a cache 314-1 and a processor 316-1. Execution node 312-2 includes a cache 314-2 and a processor 316-2. Execution node 312-$n$ includes a cache 314-$n$ and a processor 316-$n$. Additionally, virtual warehouse 3 includes three execution nodes 322-1, 322-2, and 322-$n$. Execution node 322-1 includes a cache 324-1 and a processor 326-1. Execution node 322-2 includes a cache 324-2 and a processor 326-2. Execution node 322-$n$ includes a cache 324-$n$ and a processor 326-$n$.

In some embodiments, the execution nodes shown in FIG. 3 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-$n$ at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
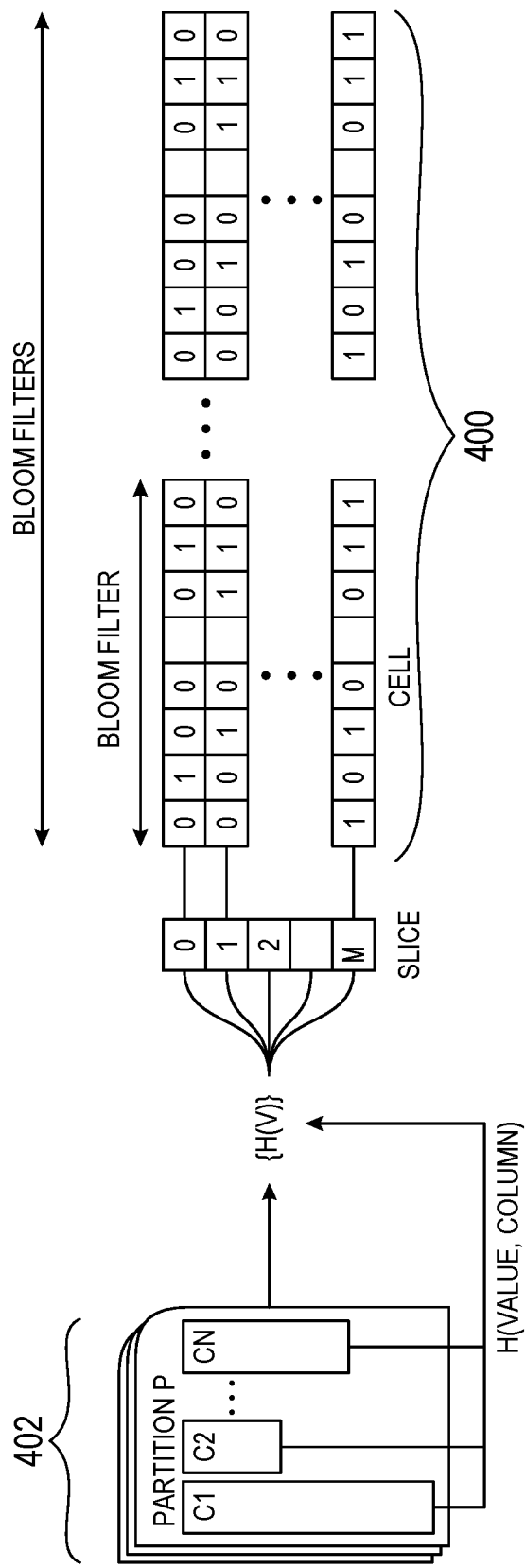
FIG. 4 is a conceptual diagram illustrating generation of an example blocked bloom filter, which may form part of a pruning index, in accordance with some example embodiments.

FIG. 4 is a conceptual diagram illustrating generation of a filter 400, which forms part of a pruning index generated by the database system 102 based on a source table 402, in accordance with some example embodiments. As shown, the source table 402 is organized into multiple micro-partitions and each micro-partition comprises multiple columns in which values are stored.

In generating a pruning index, the compute service manager 108 generates a filter for each micro-partition of the source table 402, an example of which is illustrated in FIG. 4 as blocked bloom filter 400. Blocked bloom filter 400 comprises multiple bloom filters and encodes the existence of distinct N-grams present in each column of the corresponding micro-partition. When a query is received, rather than scanning the entire source table 402 to evaluate query, the database system 102 probes the pruning index to identify a reduced scan set of micro-partitions comprising only a subset of the micro-partitions of the source table 402.

As shown, the blocked bloom filter 400 is decomposed into N bloom filters stored as individual columns of the pruning index to leverage columnar scans. In generating the blocked bloom filter 400 for a particular micro-partition of the source table 402, N-grams of stored values or preprocessed variants thereof are transformed into bit positions in the bloom filters. For example, a set of fingerprints (e.g., hash values) can be generated from N-grams of stored values in each column of the micro-partition and the set of fingerprints may be used to set bits in the bloom filters. Each line of the blocked bloom filter 400 is encoded and stored as a single row in the pruning index. Each bloom filter 400 is represented in the pruning index as a two-dimensional array indexed by the fingerprints of the N-grams of the stored column values.

FIG. 5 illustrates a portion of an example pruning index 500, in accordance with some embodiments of the present disclosure. The example pruning index 500 is organized into a plurality of rows and columns. The columns of the pruning index 500 comprise a partition number 502 to store a partition identifier and a blocked bloom filter 504 (e.g., the blocked bloom filter 400) that is decomposed into multiple numeric columns, each column in the blocked bloom filter 504 represents a bloom filter. To avoid obscuring the inventive subject matter with unnecessary detail, various additional columns that are not germane to conveying an understanding of the inventive subject matter may have been omitted from the example pruning index 500 in FIG. 5.

Figure 6:
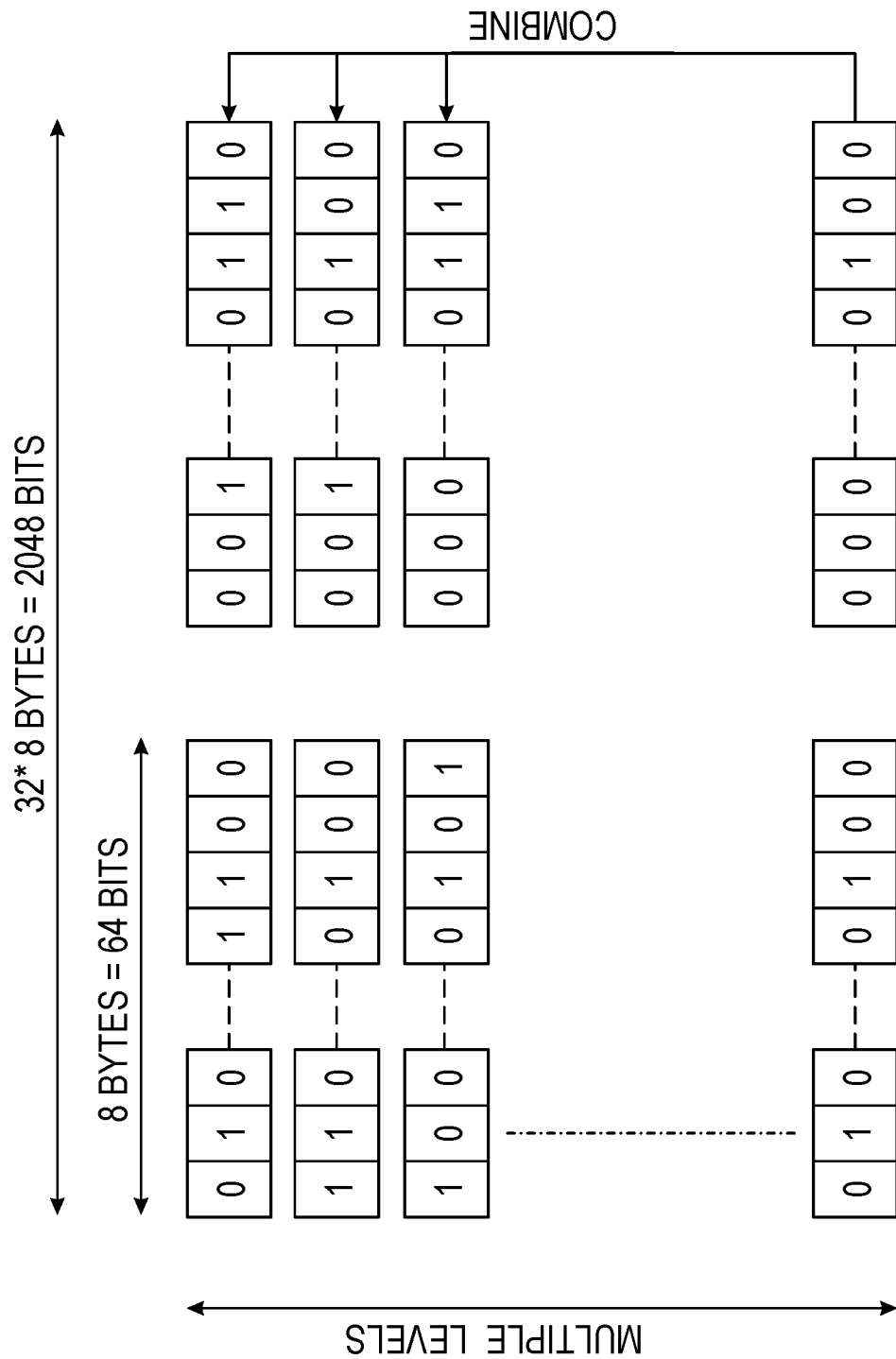
FIG. 6 is a conceptual diagram illustrating further details regarding the creation of an example pruning index, in accordance with some embodiments.

FIG. 6 is a conceptual diagram illustrating creation of an example pruning index, in accordance with some embodiments. The creation of a filter (e.g., a blocked bloom filter) is performed by a specialized operator within the compute service manager 108 that computes the set of rows of the pruning index. This operator obtains all the columns of a particular micro-partition of a source table and populates the filter for that micro-partition.

If the total number of distinct N-grams in the source table is unknown, the compute service manager 108 allocates a maximum number of levels to the pruning index, populates each filter and then applies a consolidation phase to merge the different filters in a final representation of the pruning index. The memory allocated to compute this information per micro-partition is constant. In the example illustrated in FIG. 6, the memory allocated to compute this information is a two-dimensional array of unsigned integers. The first dimension is indexed by the level (maximum number of levels) and the second dimension is indexed by the number of bloom filters. Since each partition is processed by a single thread, the total memory is bounded by the number of threads (e.g., 8) and the maximum level of levels.

As shown in FIG. 6, at each partition boundary, the compute service manager 108 combines blocks based on a target bloom filter density. For example, the compute service manager 108 may combine blocks such that the bloom filter density is no more than half. Since the domain of fingerprints (e.g., hashed values) is uniform, this can be done incrementally or globally based on the observed number of distinct values computed above.

If the number of distinct values is known, the compute service manager 108 determines the number of levels for the pruning index by dividing the maximum number of distinct N-grams by the number of distinct N-grams per level. To combine two levels, the compute service manager 108 performs a logical OR on all the integers representing the filter.

For performance reasons, the filter functions (create and check) can combine two hash functions (e.g., two 32-bit hash functions). Both the hash function computation and the filter derivation need to be identical on both the execution platform 110 and compute service manager 108 to allow for pruning in compute service manager 108 and in the scan set initialization in the execution platform 110.

Figure 7:
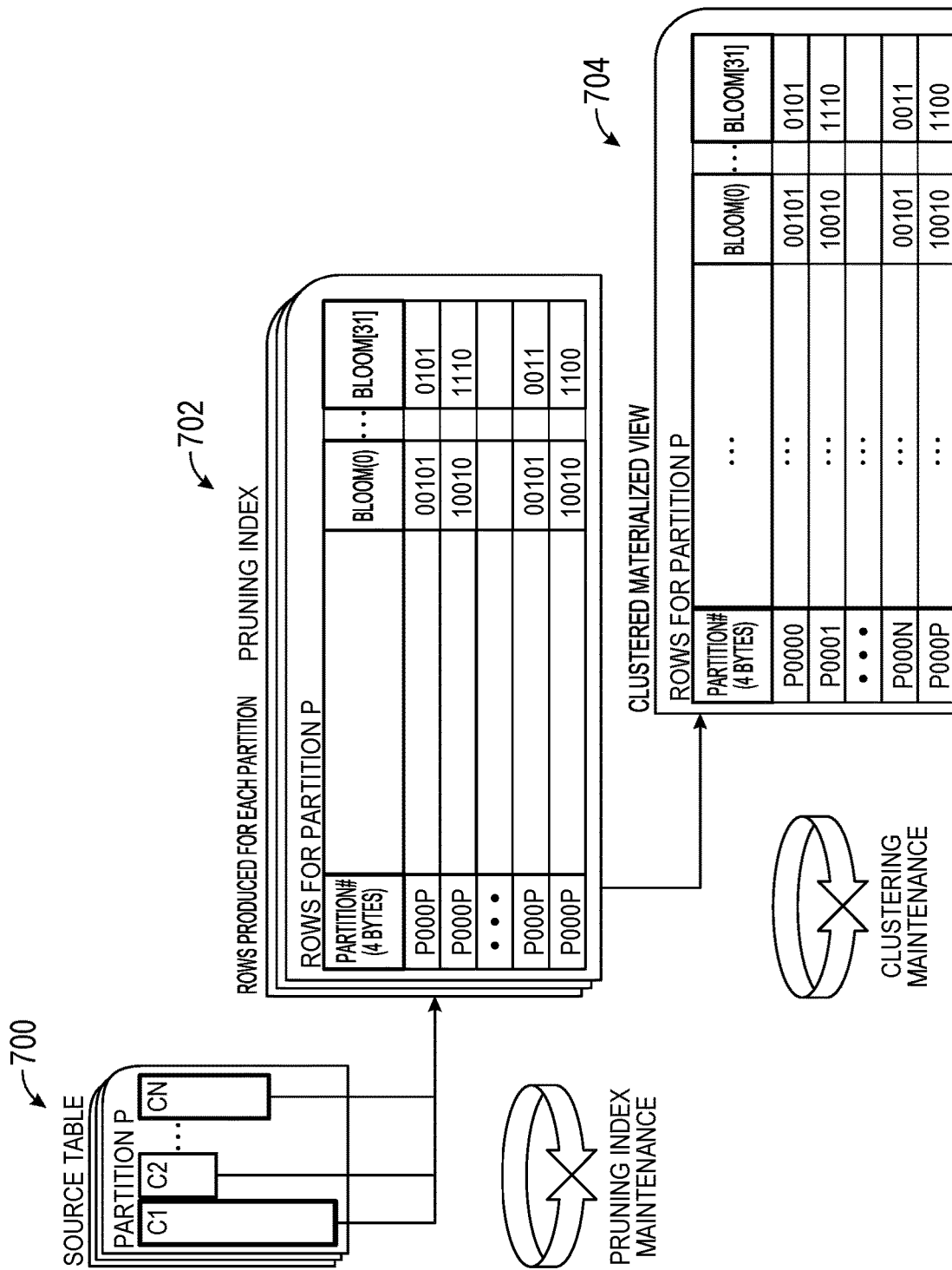
FIG. 7 is a conceptual diagram illustrating maintenance of a pruning index, in accordance with some embodiments.
Figure 8:
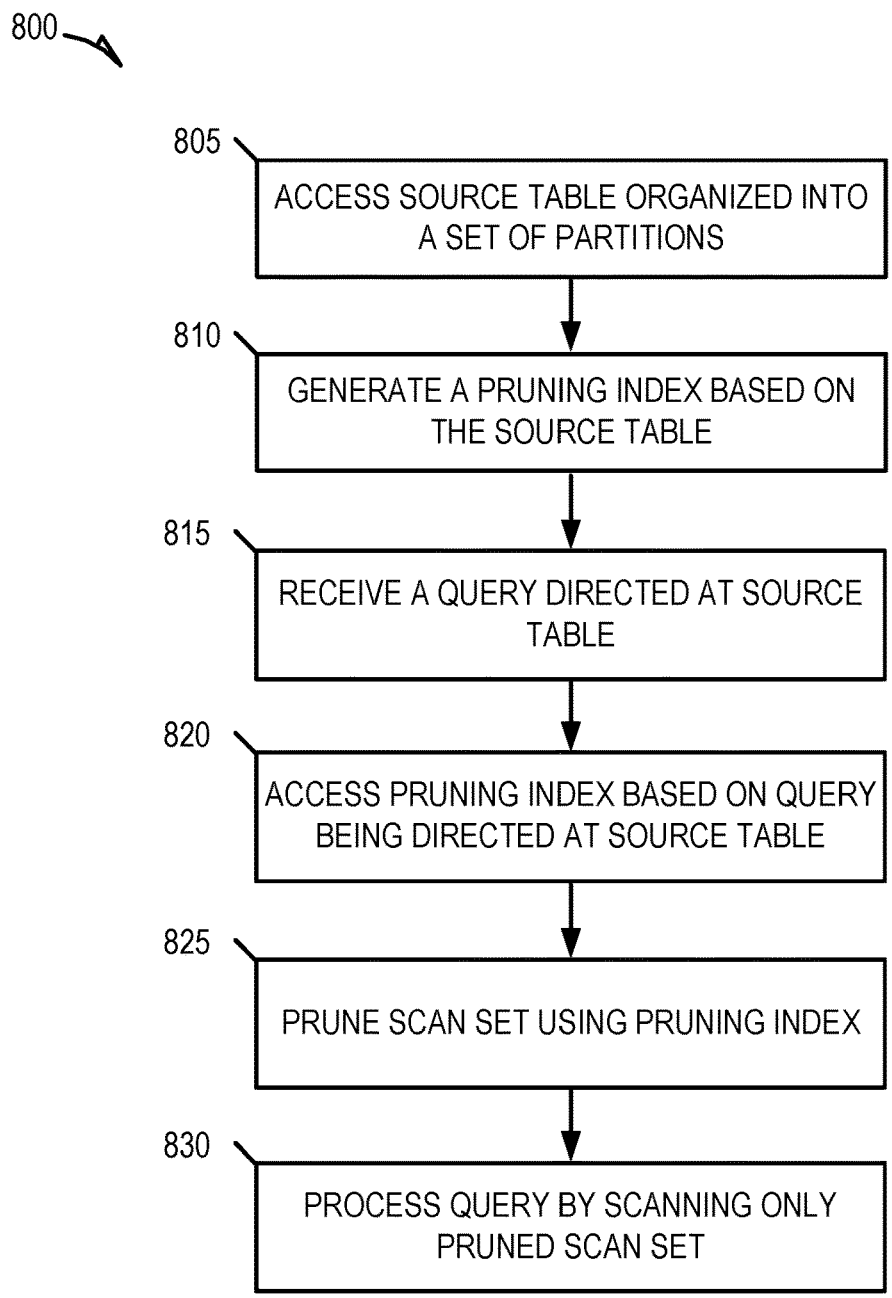
FIGS. 8-10 are flow diagrams illustrating operations of the network-based database system in performing a method for generating and using a pruning index in processing a database query, in accordance with some embodiments of the present disclosure.

FIG. 7 is a conceptual diagram illustrating maintenance of a pruning index based on changes to a source table, in accordance with some embodiments. As shown, at 700, a change is made to a source table (e.g., addition of one or more rows or columns). The change to the source table triggers generation of additional rows in the pruning index for each changed or new micro-partition of the source table, at 702. At a regular interval, the newly produced rows in the pruning index are reclustered, at 704.

The compute service manager 108 uses a deterministic selection algorithm as part of clustering the prune index. The processing of each micro-partition in the source table creates a bounded (and mostly constant) number of rows based on the number of distinct N-grams in the source micro-partition. By construction, those rows are known to be unique and the index domain is non-overlapping for that partition and fully overlapping with already clustered index rows. To minimize the cost of clustering, the compute service manager 108 delays reclustering of rows until a threshold number of rows have been produced to create constant partitions.

Although the pruning index is described in some embodiments as being implemented specifically with blocked bloom filters, it shall be appreciated that the pruning index is not limited to blocked bloom filters, and in other embodiments, the pruning index may be implemented using other filters such as bloom filters, hash filters, or cuckoo filters.

FIGS. 8-11 are flow diagrams illustrating operations of the database system 102 in performing a method 800 for generating and using a pruning index in processing a database query, in accordance with some embodiments of the present disclosure. The method 800 may be embodied in computer-readable instructions for execution by one or more hardware components (e.g., one or more processors) such that the operations of the method 800 may be performed by components of database system 102. Accordingly, the method 800 is described below, by way of example with reference thereto. However, it shall be appreciated that the method 800 may be deployed on various other hardware configurations and is not intended to be limited to deployment within the database system 102.

Depending on the embodiment, an operation of the method 800 may be repeated in different ways or involve intervening operations not shown. Though the operations of the method 800 may be depicted and described in a certain order, the order in which the operations are performed may vary among embodiments, including performing certain operations in parallel or performing sets of operations in separate processes. For example, although the use and generation of the pruning index are described and illustrated together as part of the method 800, it shall be appreciated that the use and generation of the pruning index may be performed as separate processes, consistent with some embodiments.

At operation 805, the compute service manager 108 accesses a source table that is organized into a plurality of micro-partitions. The source table comprises a plurality of cells organized into rows and columns and a data value is included in each cell.

At operation 810, the compute service manager 108 generates a pruning index based on the source table. The pruning index comprises a set of filters (e.g., a set of blocked bloom filters) that index distinct N-grams in each column of each micro-partition of the source table. A filter is generated for each micro-partition in the source table and each filter is decomposed into multiple numeric columns (e.g., 32 numeric columns) to enable integer comparisons. Consistent with some embodiments, the pruning index comprises a plurality of rows and each row comprises at least a micro-partition identifier and a set of bloom filters. Consistent with some embodiments, the compute service manager 108 generates the pruning index in an offline process before receiving a query.

At operation 815, the compute service manager 108 receives a query directed at the source table. The query can comprise an equality predicate (e.g., "=") or a pattern matching predicate (e.g., LIKE, ILIKE, CONTAINS, STARTSWITH, or ENDSWITH). In instances in which the query includes a pattern matching predicate, the query specifies a search pattern for which matching stored data in the source table is to be identified.

At operation 820, the compute service manager 108 accesses the pruning index associated with the source table based on the query being directed at the source table. For example, the database 114 may store information describing associations between tables and pruning indexes.

At operation 825, the compute service manager 108 uses the pruning index to prune the set of micro-partitions of the source table to be scanned for data that satisfies the query (e.g., a data value that satisfies the equality predicate or data that matches the search pattern). That is, the compute service manager 108 uses the pruning index to identify a reduced scan set comprising only a subset of the micro-partitions of the source table. The reduced scan set includes one or more micro-partitions in which data that satisfies the query is potentially stored. The subset of micro-partitions of the source table include micro-partitions determined to potentially include data that satisfies the query based on the set of bloom filters in the pruning index.

At operation 830, the execution platform 110 to process the query. In processing the query, the execution platform 110 scans the subset of micro-partitions of the reduced scan set while foregoing a scan of the remaining micro-partitions. In this way, the execution platform 110 searches only micro-partitions where matching data is potentially stored while foregoing an expenditure of additional time and resources to also search the remaining micro-partitions for which it is known, based on the pruning index, that matching data is not stored.

Consistent with some embodiments, rather than providing a reduced scan set with micro-partitions of the source table to scan for data, the compute service manager 108 may instead identify and compile a set of non-matching micro-partitions. The compute service manager 108 or the execution platform 110 may remove micro-partitions from the scan set based on the set of non-matching micro-partitions.

Figure 9:
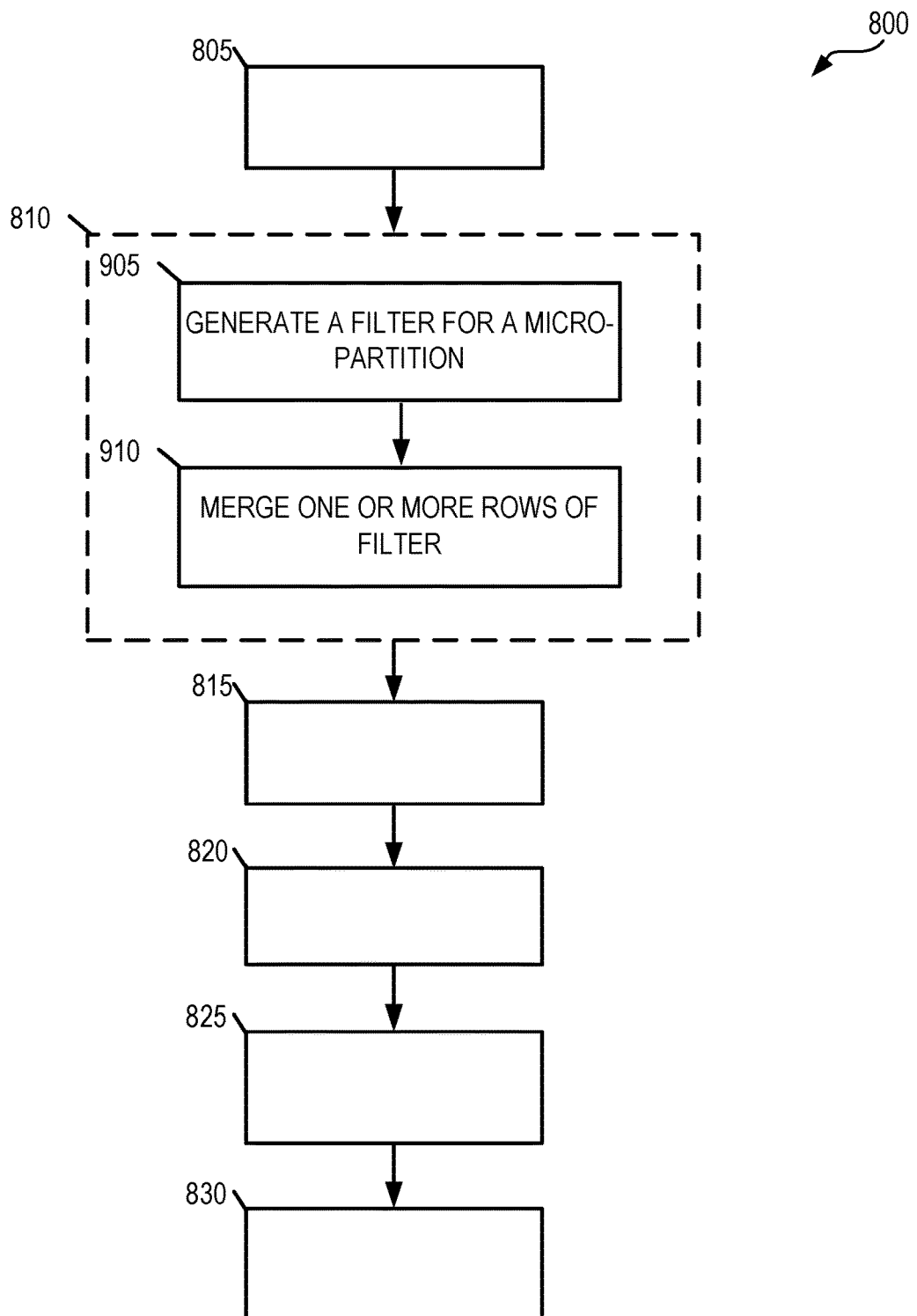

As shown in FIG. 9, the method 800 may, in some embodiments, further include operations 905 and 910. Consistent with these embodiments, the operations 905 and 910 may be performed as part of the operation 810 where the compute service manager 108 generates the pruning index. The operations 905 and 910 are described below in reference to a single micro-partition of the source table simply for ease of explanation. However, it shall be appreciated, that in generating the pruning index, the compute service manager 108 generates a filter for each micro-partitions of the source table and thus, the operations 905 and 910 may be performed for each micro-partition of the source table.

At operation 905, the compute service manager 108 generates a filter for a micro-partition of the source table. For example, the compute service manager 108 may generate a blocked bloom filter for the micro-partition that indexes distinct N-grams in each column of the micro-partition of the source table. The generating of the filter includes generating a set of fingerprints for each searchable data value in the micro-partition. For a given data value in the micro-partition, the compute service manager 108 generates the set of fingerprints based on a set of N-grams generated for the data value. The set of N-grams can be generated based on the data value or one or more preprocessed variants of the data value. The compute service manager 108 can generate a fingerprint based on a hash that is computer of an N-gram. In computing the hash, the compute service manager 108 may utilize a rolling hash function or other known hashing scheme that allows individual characters to be added or removed from a window of characters. Each generated fingerprint is used to populate a cell in the filter.

At operation 910, which is optional in some embodiments, the compute service manager 108 merges one or more rows of the filter. The compute service manager 108 can merge rows by performing a logical OR operation. The compute service manager 108 may merge rows of the filter until a density threshold is reached, where the density refers to the ratio of 1's and 0's in a row. The density threshold may be based on a target false positive rate.

Figure 10:
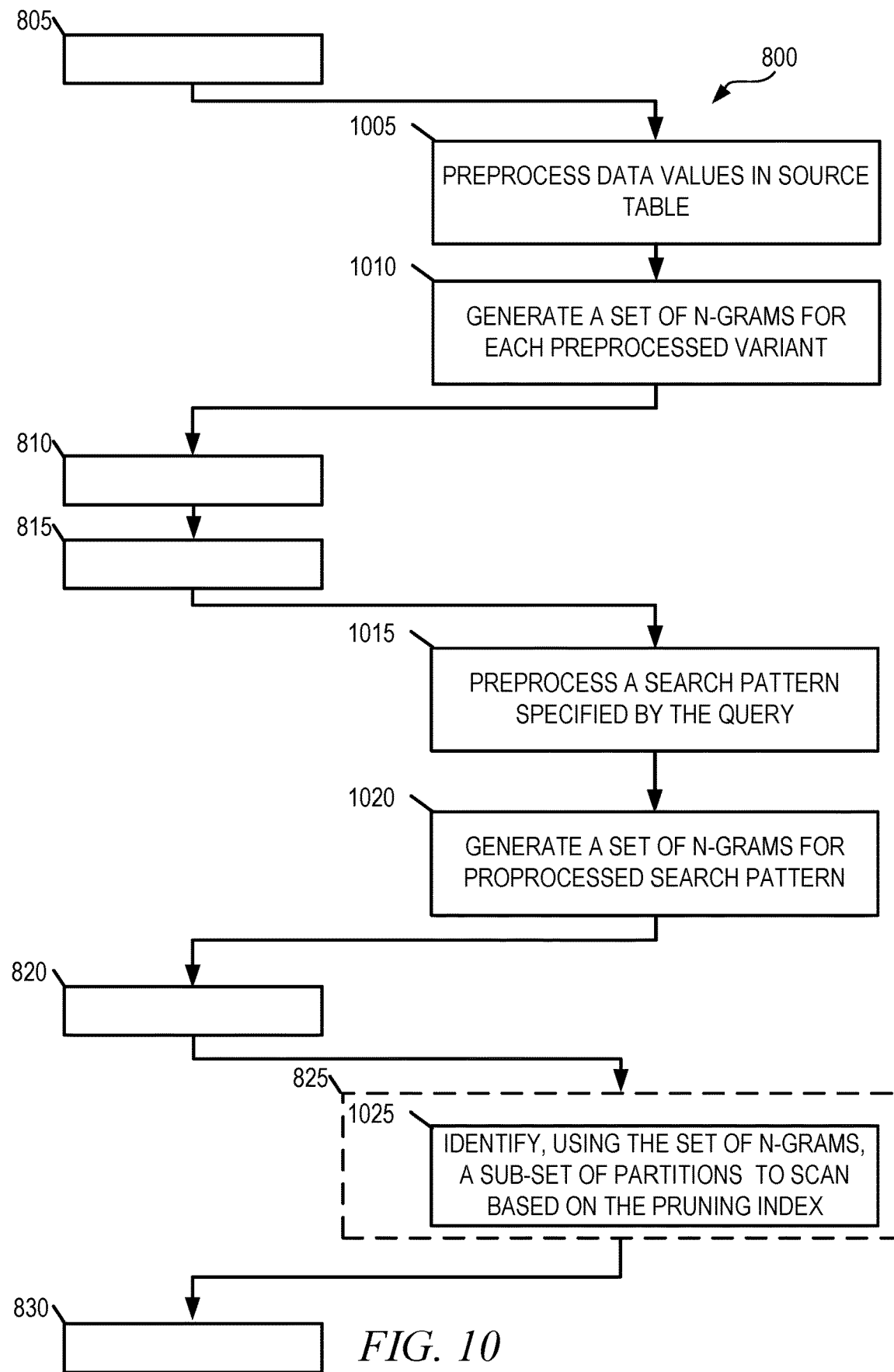

As shown in FIG. 10, the method 800 may, in some embodiments, include operations 1005, 1010, 1015, 1020, and 1025. Consistent with these embodiments, the operations 1005 and 1010 may be performed prior to operation 810 where the compute service manager 108 generates the pruning index for the source table. At operation 1005, the compute service manager 108 preprocesses the data values in the cells of the source table. In preprocesses a given data value, the compute service manager 108 generates one or more preprocessed variants of the data value. In performing the preprocessing, the compute service manager performs one or more normalization operations to a given data value. The compute service manager 108 can utilize one of several known normalization techniques to normalize data values (e.g., normalization form canonical composition).

For a given data value, the preprocessing performed by the compute service manager 108 can include, for example, any one or more of: generating a case-agnostic variant, (e.g., by converting uppercase characters to lowercase characters), generating one or more misspelled variants based on common or acceptable misspellings of the data value, and generating one or more synonymous variants corresponding to synonyms of the data value. In general, in generating a preprocessed variant (e.g., case-agnostic variant, misspelled variant, a synonymous variant or a variant with special characters to indicate a start and end to a data value), the compute service manager 108 uses a common knowledge base to transform a data value into one or more permutations of the original data value.

As an example of the forgoing, the string "Bob" can be transformed into to the case-agnostic variant "bob." As another example, the preprocessed variants of "bob" "bbo" and "obb" can be generated for the string "Bob" to account for misspellings.

At operation 1010, the compute service manager 108 generates a set of N-grams for each preprocessed variant. An N-gram in this context refers to a contiguous sequence of N-items (e.g., characters or words) in a given value. For a given preprocessed variant of a data value in the source table, the compute service manager 108 transforms the value into multiple segments of equal length. For example, for a string, the compute service manager 108 can transform the string into multiple sub-strings of N-characters.

Depending on the embodiment, the value of N can be predetermined or dynamically computed at the time of generating the pruning index. In embodiments in which the value of N is precomputed, the compute service manager 108 determines an optimal value for N based on a data types of values in the source table. In some embodiments, multiple values of N can be used. That is, a first subset of N-grams can be generated using a first value for N and a second subset of N-grams can be created using a second value of N.

Consistent with these embodiments, the operations 1015 and 1020 can be performed prior to operation 820 where the compute service manager 108 prunes the scan set using the pruning index. At operation 1015, the compute service manager 108 preprocesses a search pattern included in the query. In preprocessing the search pattern, the compute service manager 108 performs the same preprocessing operations that are performed on the data values in the source table at 1005 to ensure that the characters of the search pattern fit the pruning index. Hence, in preprocessing the search pattern, the compute service manager 108 can perform any one or more of: generating a case-agnostic variant of the search pattern (e.g., by converting uppercase characters to lowercase characters), generating one or more misspelled variants based on common or acceptable misspellings of the search pattern, generating one or more synonymous variants corresponding to synonyms of the search pattern, and generating a variant that include special characters to mark a start and end of the search pattern. In preprocessing a given pattern, the compute service manager 108 can generate one or more preprocessed variants of the search pattern. For example, the compute service manager 108 can generate any one or more of: a case-agnostic variant, misspelled variant, or a synonymous variant for the search pattern. As a further example, the compute service manager 108 can generate a variant that includes special characters to indicate a start and end of a search pattern (e.g., "^testvalue$" for the search pattern "testvalue").

At operation 1020, the compute service manager 108 generates a set of N-grams for the search pattern based on the one or more preprocessed variants of the search pattern. The compute service manager 108 uses the same value for N that was used to generate the pruning index. In embodiments in which the compute service manager 108 uses multiple values for N in generating the pruning index, the compute service manager 108 uses the same values for generating the set of N-grams for the search pattern.

In an example, the query includes the following statement:

WHERE a ILIKE '%LoremIpsum%Dolor%Sit%Amet'

In this example, '%LoremIpsum%Dolor%Sit%Amet' is the search pattern and in preprocessing the search pattern, the compute service manager 108 converts the search pattern to all lower case to create a case-agnostic variant: '%loremipsum%dolor%sit%amet'. The compute service manager 108 splits the search pattern into segments at the wild card positions, which, in this example, produces the following sub-strings: "loremipsum", "dolor", "sit", and "amet". Based on these sub-strings, the compute service manager 108 generates the following set of N-grams:

Set ["lorem", "oremi", "remip", "emips", "mipsu", "ipsum", "dolor"]

In this example N is 5, and thus the compute service manager 108 discards the sub-strings "sit" and "amet" as their length is less than 5.

As shown, consistent with these embodiments, the operation 1025 can be performed as part of the operation 825 where the compute service manager 108 prunes the scan set using the pruning index. At operation 1025, the compute service manager 108 uses the set of N-grams generated based on the search pattern to identify a subset of micro-portions of the source table to scan based on the pruning index. The compute service manager 108 may identify the subset of micro-partitions by generating a set of fingerprints based on the set of N-grams (e.g., by computing a hash for each N-gram), comparing the set of fingerprints to values included in the pruning index (e.g., fingerprints of stored data values in the source table), and identifying one or more values in the pruning index that match one or more fingerprints in the set of fingerprints generated based on the N-grams of the search pattern. Specifically, the compute service manager 108 identifies one or more micro-partitions that potentially store data that satisfies the query based on fingerprints of data values in the pruning index that match fingerprints in the set of fingerprints computed for the search pattern. That is, a fingerprint (e.g., hash value computed based on an N-gram of a preprocessed stored data value in the source table) in the pruning index that matches a fingerprint generated from an N-gram of the search pattern (e.g., a hash value computed based on the N-gram) indicates that matching data is potentially stored in a corresponding column of the micro-partition because the N-gram generated from the search pattern is stored in the column of the micro-partition. The corresponding micro-partition can be identified by the compute service manager 108 based on the matching fingerprint in the pruning index. Consistent with some embodiments, in identifying the subset of micro-partitions, the compute service manager 108 uses the pruning index to identify any micro-partitions that contain any one of the fingerprints generated from the search pattern N-grams, and from these micro-partitions, the compute service manager 108 then identifies the micro-partitions that contain all of the N-grams. That is, the compute service manager 108 uses the pruning index to identify a subset of micropartions that contain data matching all fingerprints generated based on the N-grams of the search pattern. For example, given fingerprints f1, f2, and f3, the compute service manager 108 uses the pruning index to determine: a first micro-partition and second micro-partition contain data corresponding to f1; the second micro-partition and a third micro-partition that contains data corresponding to f2; and the first, second, and third micro-partition contain data corresponding to f3. In this example, the compute service manager 108 selects only the second micro-partition for scanning based on the second micro-partition containing data that corresponds to all three fingerprints.

Figure 11:
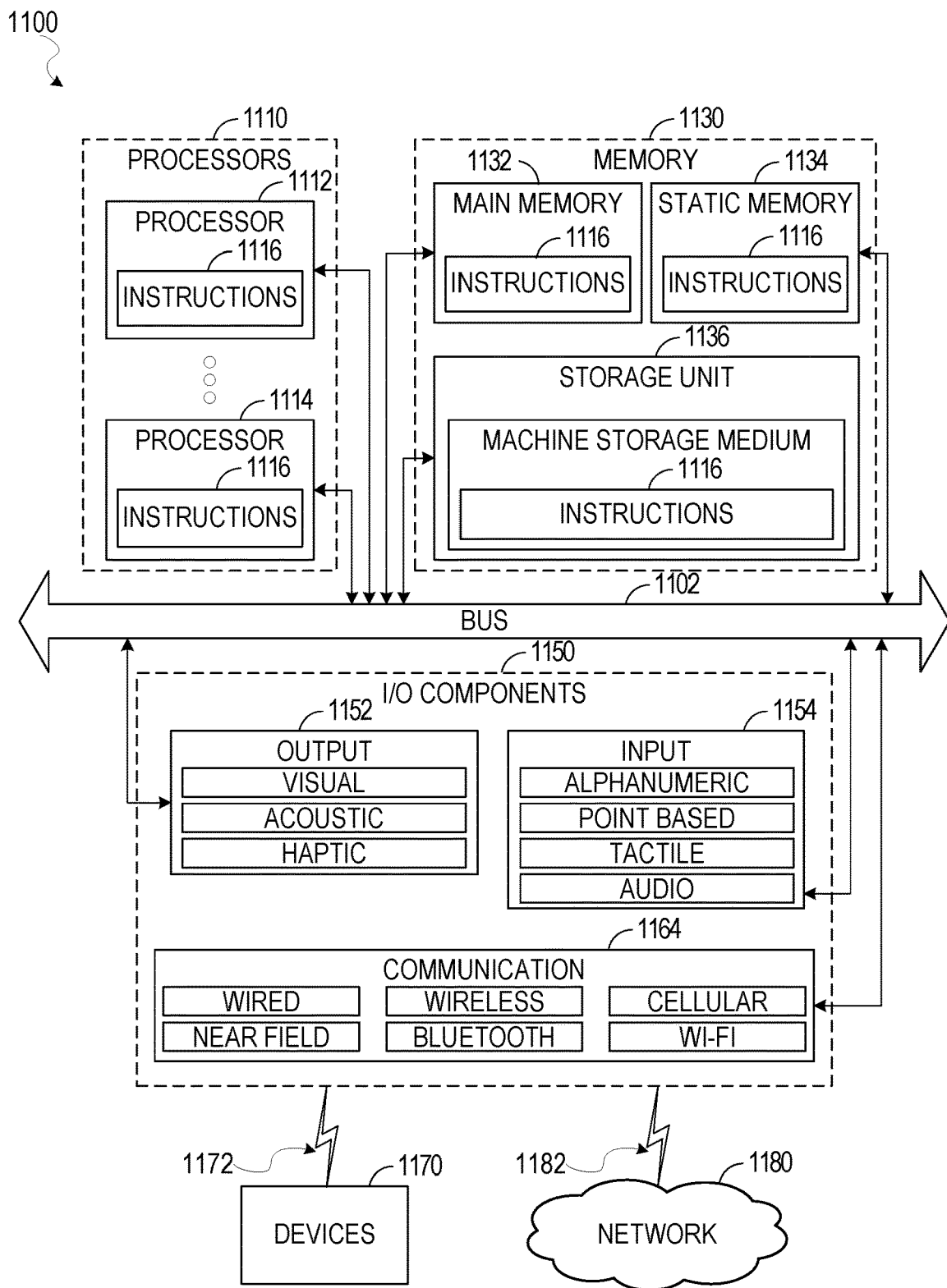
FIG. 11 illustrates a diagrammatic representation of a machine in the form of a computer system within which a set of instructions may be executed for causing the machine to perform any one or more of the methodologies discussed herein, in accordance with some embodiments of the present disclosure.

FIG. 11 illustrates a diagrammatic representation of a machine 1100 in the form of a computer system within which a set of instructions may be executed for causing the machine 1100 to perform any one or more of the methodologies discussed herein, according to an example embodiment. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example, the instructions 1116 may cause the machine 1100 to execute any one or more operations of any one or more of the method 800. As another example, the instructions 1116 may cause the machine 1100 to implement portions of the functionality illustrated in any one or more of FIGS. 4-8. In this way, the instructions 1116 transform a general, non-programmed machine into a particular machine 1100 (e.g., the compute service manager 108, the execution platform 110, and the data storage devices 206) that is specially configured to carry out any one of the described and illustrated functions in the manner described herein.

In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 includes processors 1110, memory 1130, and input/output (I/O) components 1150 configured to communicate with each other such as via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1112 and a processor 1114 that may execute the instructions 1116. The term "processor" is intended to include multi-core processors 1110 that may comprise two or more independent processors (sometimes referred to as "cores") that may execute instructions 1116 contemporaneously. Although FIG. 11 shows multiple processors 1110, the machine 1100 may include a single processor with a single core, a single processor with multiple cores (e.g., a multi-core processor), multiple processors with a single core, multiple processors with multiple cores, or any combination thereof.

The memory 1130 may include a main memory 1132, a static memory 1134, and a storage unit 1136, all accessible to the processors 1110 such as via the bus 1102. The main memory 1132, the static memory 1134, and the storage unit 1136 store the instructions 1116 embodying any one or more of the methodologies or functions described herein. The instructions 1116 may also reside, completely or partially, within the main memory 1132, within the static memory 1134, within the storage unit 1136, within at least one of the processors 1110 (e.g., within the processor's cache memory), or any suitable combination thereof, during execution thereof by the machine 1100.

The I/O components 1150 include components to receive input, provide output, produce output, transmit information, exchange information, capture measurements, and so on. The specific I/O components 1150 that are included in a particular machine 1100 will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or another suitable device to interface with the network 1180. In further examples, the communication components 1164 may include wired communication components, wireless communication components, cellular communication components, and other communication components to provide communication via other modalities. The devices 1170 may be another machine or any of a wide variety of peripheral devices (e.g., a peripheral device coupled via a universal serial bus (USB)). For example, as noted above, the machine 1100 may correspond to any one of the compute service manager 108, the execution platform 110, and the devices 1170 may include the data storage device 206 or any other computing device described herein as being in communication with the network-based data warehouse system 102 or the storage platform 104.

Examples

Example 1 is a database system comprising: at least one hardware processor; and at least one memory storing instructions that cause the at least one hardware processor to perform operations comprising: receiving a query directed at a source table organized into a set of batch units, the query including a pattern matching predicate specifying a search pattern; generating a set of N-grams based on the search pattern; accessing a pruning index associated with the source table, the pruning index comprising a set of filters that index distinct N-grams in each column of the source table; identifying, using the set of N-grams generated based on the search pattern, a subset of batch units to scan for matching data based on the pruning index associated with the source table; and processing the query by scanning the subset of batch units.

Example 2 includes the database system of example 1, wherein: the operations further comprise preprocessing the search pattern before generating the set of N-grams, and the preprocessing of the search pattern includes generating one or more preprocessed variants of the search pattern.

Example 3 includes the database system of any one or more of examples 1 or 2, wherein the preprocessing of the search pattern includes generating a case-agnostic variant of the search pattern.

Example 4 includes the database system of any one or more of examples 1-3, wherein the preprocessing of the search pattern includes generating one or more misspelled variants of the search pattern.

Example 5 includes the database system of any one or more of examples 1-4, wherein the preprocessing of the search pattern includes generating one or more synonymous variants corresponding to synonyms of the search pattern.

Example 6 includes the database system of any one or more of examples 1-5, wherein the preprocessing of the search pattern includes generating a variant with one or more special characters to mark a start and end of the search pattern.

Example 7 includes the database system of any one or more of examples 1-6, wherein identifying the subset of batch units comprises: generating a set of fingerprints based on the set of N-grams; and comparing the set of fingerprints to the pruning index.

Example 8 includes the database system of any one or more of examples 1-7, wherein generating the set of fingerprints based on the set of N-grams comprises computing a hash for each N-gram in the set of N-grams.

Example 9 includes the database system of any one or more of examples 1-8, wherein identifying the subset of batch units further comprises: identifying one or more values in the pruning index that match one or more fingerprints in the set of fingerprints; and identifying the subset of batch units based on the one or more values.

Example 10 includes the database system of any one or more of examples 1-9, wherein the pruning index comprises a set of filters, each filter in the set of filters corresponding to one batch unit in the set of batch units.

Example 11 is a method comprising: receiving a query directed at a source table organized into a set of batch units, the query including a pattern matching predicate specifying a search pattern; generating a set of N-grams based on the search pattern; accessing a pruning index associated with the source table, the pruning index comprising a set of filters that index distinct N-grams in each column of the source table; identifying, using the set of N-grams generated based on the search pattern, a subset of batch units to scan for matching data based on the pruning index associated with the source table; and processing the query by scanning the subset of batch units.

Example 12 includes the method of example 11, wherein: the method further comprises preprocessing the search pattern before generating the set of N-grams, wherein the preprocessing of the search pattern includes generating one or more preprocessed variants of the search pattern.

Example 13 includes the method of any one or more of examples 11 or 12, wherein the preprocessing of the search pattern includes generating a case-agnostic variant of the search pattern.

Example 14 includes the method of any one or more of examples 11-13, wherein the preprocessing of the search pattern includes generating one or more misspelled variants of the search pattern.

Example 15 includes the method of any one or more of examples 11-14, wherein the preprocessing of the search pattern includes generating one or more synonymous variants corresponding to synonyms of the search pattern.

Example 16 includes the method of any one or more of examples 11-15, wherein the preprocessing of the search pattern includes generating a variant with one or more special characters to mark a start and end of the search pattern.

Example 17 includes the method of any one or more of examples 11-16, wherein identifying the subset of batch units comprises: generating a set of fingerprints based on the set of N-grams; and comparing the set of fingerprints to the pruning index.

Example 18 includes the method of any one or more of examples 11-17, wherein generating the set of fingerprints based on the set of N-grams comprises computing a hash for each N-gram in the set of N-grams.

Example 19 includes the method of any one or more of examples 11-18, wherein identifying the subset of batch units further comprises: identifying one or more values in the pruning index that match one or more fingerprints in the set of fingerprints; and identifying the subset of batch units based on the one or more values.

Example 20 includes the method of any one or more of examples 11-19, wherein the pruning index comprises a set of filters, each filter in the set of filters corresponding to one batch unit in the set of batch units.

Example 21 is a computer-storage medium comprising instructions that, when executed by one or more processors of a machine, configure the machine to perform operations comprising: receiving a query directed at a source table organized into a set of batch units, the query including a pattern matching predicate specifying a search pattern; generating a set of N-grams based on the search pattern; accessing a pruning index associated with the source table, the pruning index comprising a set of filters that index distinct N-grams in each column of the source table; identifying, using the set of N-grams generated based on the search pattern, a subset of batch units to scan for matching data based on the pruning index associated with the source table; and processing the query by scanning the subset of batch units.

Example 22 includes the computer-storage medium of example 21, wherein: the operations further comprise preprocessing the search pattern before generating the set of N-grams, and the preprocessing of the search pattern includes generating one or more preprocessed variants of the search pattern.

Example 23 includes the computer-storage medium of any one or more of examples 21 or 22, wherein the preprocessing of the search pattern includes generating a case-agnostic variant of the search pattern.

Example 24 includes the computer-storage medium of any one or more of examples 21-23, wherein the preprocessing of the search pattern includes generating one or more misspelled variants of the search pattern.

Example 25 includes the computer-storage medium of any one or more of examples 21-24, wherein the preprocessing of the search pattern includes generating one or more synonymous variants corresponding to synonyms of the search pattern.

Example 26 includes the computer-storage medium of any one or more of examples 21-25, wherein the preprocessing of the search pattern includes generating a variant with one or more special characters to mark a start and end of the search pattern.

Example 27 includes the computer-storage medium of any one or more of examples 21-26, wherein identifying the subset of batch units comprises: generating a set of fingerprints based on the set of N-grams; and comparing the set of fingerprints to the pruning index.

Example 28 includes the computer-storage medium of any one or more of examples 21-27, wherein generating the set of fingerprints based on the set of N-grams comprises computing a hash for each N-gram in the set of N-grams.

Example 29 includes the computer-storage medium of any one or more of examples 21-28, wherein identifying the subset of batch units further comprises: identifying one or more values in the pruning index that match one or more fingerprints in the set of fingerprints; and identifying the subset of batch units based on the one or more values.

Example 30 includes the computer-storage medium of any one or more of examples 21-29, wherein the pruning index comprises a set of filters, each filter in the set of filters corresponding to one batch unit in the set of batch units.

Executable Instructions and Machine Storage Medium

The various memories (e.g., 1130, 1132, 1134, and/or memory of the processor(s) 1110 and/or the storage unit 1136) may store one or more sets of instructions 1116 and data structures (e.g., software) embodying or utilized by any one or more of the methodologies or functions described herein. These instructions 1116, when executed by the processor(s) 1110, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1180 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., hypertext transfer protocol (HTTP)). Similarly, the instructions 1116 may be transmitted or received using a transmission medium via the coupling 1172 (e.g., a peer-to-peer coupling) to the devices 1170. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the method 800 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   at least one hardware processor; and
   at least one memory storing instructions that cause the at least one hardware processor to perform operations comprising:
   preprocessing data values in a source table that is organized into a set of batch units, the preprocessing of the data values comprising generating one or more variants of a data value from the source table;
   generating a pruning index for the source table based on a set of N-grams generated based on the data value and the one or more variants of the data value, the pruning index indexing distinct N-grams in each column of the source table;
   storing, in a database, the pruning index with an association with the source table;
   receiving a query directed at the source table, the query including a pattern matching predicate specifying a search pattern;
   identifying, using the pruning index, a subset of batch units to scan for matching data; and
   processing the query by scanning the subset of batch units.

2. The system of claim 1, wherein the identifying the subset of batch units comprises:
   generating a set of fingerprints based on N-grams of the search pattern; and
   comparing the set of fingerprints to the pruning index.

3. The system of claim 2, wherein identifying the subset of batch units further comprises:
   identifying one or more values in the pruning index that match one or more fingerprints in the set of fingerprints; and
   identifying the subset of batch units based on the one or more values.

4. The system of claim 1, wherein the operations further comprise:
   generating the set of N-grams based on the data value and the one or more variants of the data value, the set of N-grams including one or more N-grams of the data value and one or more N-grams corresponding to the one or more variants of the data value.

5. The system of claim 1, wherein generating one or more variants of the data value comprises generating a case-agnostic variant of the data value.

6. The system of claim 1, wherein generating one or more variants of the data value comprises generating one or more misspelled variants of the data value.

7. The system of claim 1, wherein generating one or more variants of the data value comprises generating a synonymous variant corresponding to a synonym of the data value.

8. The system of claim 1, wherein the generating of the pruning index comprises generating a set of fingerprints based on the set of N-grams.

9. The system of claim 1, wherein pruning index comprises a set of filters, each filter in the set of filters corresponding to a batch unit in the source table, each filter in the set of filters being represented as a multiple dimension array in the pruning index.

10. A method comprising:
preprocessing data values in a source table that is organized into a set of batch units, the preprocessing of the data values comprising generating a set of variants of a data value from the source table;
generating, using at least one hardware processor, a pruning index for the source table based on a set of N-grams generated based on the data value and the set of variants of the data value, the pruning index indexing distinct N-grams in each column of the source table;
storing, in a database, the pruning index with an association with the source table
receiving a query directed at the source table, the query including a pattern matching predicate specifying a search pattern;
identifying, using the pruning index, a subset of batch units to scan for matching data; and
processing the query by scanning the subset of batch units.

11. The method of claim 10, wherein the identifying the subset of batch units comprises:
generating a set of fingerprints based on N-grams of the search pattern; and
comparing the set of fingerprints to the pruning index.

12. The method of claim 11, wherein identifying the subset of batch units further comprises:
identifying one or more values in the pruning index that match one or more fingerprints in the set of fingerprints; and
identifying the subset of batch units based on the one or more values.

13. The method of claim 10, wherein the set of variants include: a case-agnostic variant of the data value, a misspelled variant of the data value, a variant with indications of a start and an end of the data value, and a synonymous variant corresponding to a synonym of the data value.

14. The method of claim 10, wherein generating the set of variants comprises generating a case-agnostic variant of the data value.

15. The method of claim 10, wherein generating the set of variants comprises generating one or more misspelled variants of the data value.

16. The method of claim 10, wherein generating the set of variants comprises generating a synonymous variant corresponding to a synonym of the data value.

17. The method of claim 10, wherein the generating of the pruning index comprises generating a set of fingerprints based on the set of N-grams.

18. The method of claim 10, wherein pruning index comprises a set of filters, each filter in the set of filters corresponding to a batch unit in the source table, each filter in the set of filters being represented as a multiple dimension array in the pruning index.

19. A computer-storage medium comprising instructions that, when executed by one or more processors of a machine, configure the machine to perform operations comprising:
preprocessing data values in a source table that is organized into a set of batch units, the preprocessing of the data values comprising generating one or more variants of a data value from the source table;
generating a pruning index for the source table based on a set of N-grams generated based on the data value and the one or more variants of the data value, the pruning index indexing distinct N-grams in each column of the source table;
storing, in a database, the pruning index with an association with the source table
receiving a query directed at the source table, the query including a pattern matching predicate specifying a search pattern;
identifying, using the pruning index, a subset of batch units to scan for matching data; and
processing the query by scanning the subset of batch units.

20. The computer-storage medium of claim 19, wherein the identifying the subset of batch units comprises:
generating a set of fingerprints based on N-grams of the search pattern; and
comparing the set of fingerprints to the pruning index.

21. The computer-storage medium of claim 20, wherein identifying the subset of batch units further comprises:
identifying one or more values in the pruning index that match one or more fingerprints in the set of fingerprints; and
identifying the subset of batch units based on the one or more values.

22. The computer-storage medium of claim 19, wherein the operations further comprise:
generating the set of N-grams based on the data value and the one or more variants of the data value, the set of N-grams including one or more N-grams of the data value and one or more N-grams corresponding to the one or more variants of the data value.

23. The computer-storage medium of claim 19, wherein generating one or more variants of the data value comprises generating a case-agnostic variant of the data value.

24. The computer-storage medium of claim 19, wherein generating one or more variants of the data value comprises generating one or more misspelled variants of the data value.

25. The computer-storage medium of claim 19, wherein generating one or more variants of the data value comprises generating a synonymous variant corresponding to a synonym of the data value.

26. The computer-storage medium of claim 19, wherein the generating of the pruning index comprises generating a set of fingerprints based on the set of N-grams.

27. The computer-storage medium of claim 19, wherein pruning index comprises a set of filters, each filter in the set of filters corresponding to a batch unit in the source table, each filter in the set of filters being represented as a multiple dimension array in the pruning index.

* * * * *